United States Patent [19]

Ueda

[11] Patent Number: 4,909,033
[45] Date of Patent: Mar. 20, 1990

[54] HIGH PERFORMANCE EXHAUST SYSTEM FOR INTERNAL COMBUSTION ENGINE

[75] Inventor: Hideaki Ueda, Iwata, Japan

[73] Assignee: Yamaha Hatsudoki Kabushiki Kaisha, Iwata, Japan

[21] Appl. No.: 285,316

[22] Filed: Dec. 12, 1988

Related U.S. Application Data

[63] Continuation of Ser. No. 935,340, Nov. 26, 1986, abandoned.

[30] Foreign Application Priority Data

Nov. 26, 1985 [JP] Japan .................. 60-263752

[51] Int. Cl.⁴ .............................. F02B 27/02
[52] U.S. Cl. ........................ 60/313; 60/314; 60/324
[58] Field of Search ............... 60/313, 314, 312, 324

[56] References Cited

U.S. PATENT DOCUMENTS

| | | |
|---|---|---|
| 933,906 | 9/1909 | Illy . |
| 1,411,226 | 3/1922 | Stumpf . |
| 2,230,740 | 2/1941 | Birkigt . |
| 2,239,262 | 4/1941 | Violet . |
| 2,305,946 | 12/1942 | Wilson et al. . |
| 2,627,851 | 2/1953 | Cushman . |
| 2,644,436 | 7/1953 | Berlyn . |
| 2,686,398 | 8/1954 | Anderson . |
| 2,717,583 | 9/1955 | Maybach ............... 60/313 |
| 3,523,418 | 8/1970 | Marsee . |
| 3,703,937 | 11/1972 | Tenney ............... 60/314 |
| 3,751,921 | 8/1973 | Blomberg et al. . |
| 3,817,227 | 6/1974 | Onishi . |
| 3,938,330 | 2/1976 | Nakajima et al. . |
| 3,969,895 | 7/1976 | Krizman . |
| 4,051,821 | 10/1977 | Amann . |
| 4,226,298 | 10/1980 | Bancel ............... 60/314 |
| 4,254,752 | 3/1981 | Friddell et al. . |
| 4,522,029 | 6/1985 | Tomita et al. . |
| 4,539,813 | 9/1985 | Tomita et al. . |
| 4,545,200 | 10/1985 | Oike et al. . |
| 4,554,785 | 11/1985 | Oike . |
| 4,558,566 | 12/1985 | Shirakura . |

FOREIGN PATENT DOCUMENTS

| | | |
|---|---|---|
| 2567194 | 1/1986 | France ............... 60/314 |
| 27136 | 7/1974 | Japan . |
| 51-54118 | 5/1976 | Japan . |
| 174719 | 12/1979 | Japan . |
| 154539 | 11/1981 | Japan . |
| 32920 | 2/1985 | Japan ............... 60/313 |
| 72925 | 5/1985 | Japan . |
| 231156 | 9/1926 | United Kingdom . |
| 262044 | 2/1928 | United Kingdom . |
| 519806 | 4/1940 | United Kingdom . |
| 542429 | 1/1942 | United Kingdom . |
| 561932 | 6/1944 | United Kingdom . |
| 572724 | 10/1945 | United Kingdom . |

*Primary Examiner*—Douglas Hart
*Attorney, Agent, or Firm*—Ernest A. Beutler

[57] ABSTRACT

A high output internal combustion engine embodying an improved exhaust system including a reflective control valve that is positioned so as to prevent the existence of positive pressure at the exhaust port during certain running conditions so as to improve induction efficiency.

11 Claims, 4 Drawing Sheets

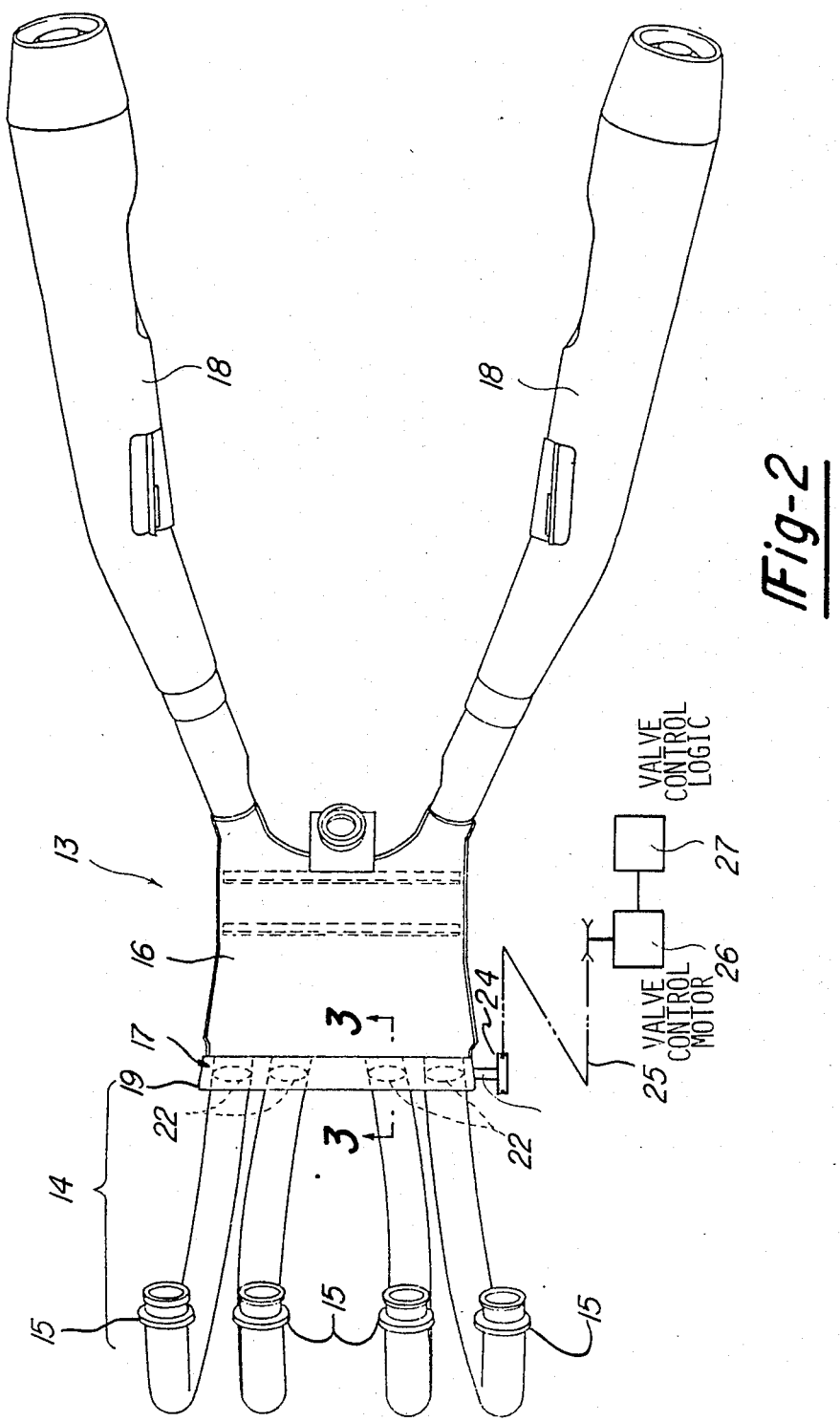

HIGH PERFORMANCE EXHAUST SYSTEM FOR INTERNAL COMBUSTION ENGINE

This is a continuation of U.S. patent application Ser. No. 935,340, filed Nov. 26, 1986 now abandoned.

BACKGROUND OF THE INVENTION

This invention relates to a high performance exhaust system for an internal combustion engine and more particularly to an exhaust system that permits a higher specific output and also which improves the output of the engine at mid-range and idle running conditions.

It is well known that the power output of an internal combustion engine, at any particular running condition, is determined by the amount of fuel/air charge that can be successfully inducted into the combustion chamber and completely burned during each cycle of the engine operation. Thus, the efficiency of the engine is directly related to its charging efficiency. A wide variety of devices have been employed for improving the charging efficiency of an internal combustion engine. Such devices include multiple intake and exhaust valves, turbo-charging, and/or the use of considerable overlap between the opening of the intake valve and the closing of the exhaust valve. High performance engines normally include either valve or port timing (depending on whether they are four or two-cycle type) that have considerable overlap to achieve high power output.

Although such overlapping valve or port timing very effective to improve the high performance output of an internal combustion engine, such an arrangement for increasing the power output significantly reduces the performance at mid-range conditions. The reason for this is that there will exist at the exhaust port of the engine a high pressure during a stage of the engine operation when the intake valve is also opened. Therefore, rather than drawing a fresh fuel/air charge into the combustion chamber through the intake port, the exhaust gases tend to flow back into the combustion chamber through the exhaust port. This not only dilutes the fresh fuel/air charge in the combustion chamber but it also precludes the introduction of a complete fuel/air charge. As a result, many high performance engines employing large degrees of valve overlap have extremely poor mid-range or low speed running characteristics. This manifests itself in the torque curve of the engine wherein, although maximum power output is achieved, the torque output of the engine at mid-range and low speeds is considerably poorer than a more convention engine having less valve overlap or port timing overlap.

It is, therefore, a principal object of this invention to provide an arrangement for an internal combustion engine that will permit the achievement of high power outputs but which will not adversely affect idle and mid-range running.

It is a further object of this invention to provide an arrangement for an internal combustion engine wherein the power output of the engine may be improved at all running conditions.

It is a still further object of this invention to provide an exhaust system for an internal combustion engine that permits the use of large valve or port timing overlap without adversely affecting the performance of the engine at low and mid-ranges.

SUMMARY OF THE INVENTION

This invention is adapted to be embodied in an internal combustion engine that has a combustion chamber and an exhaust port for discharging exhaust gases from the combustion chamber. An exhaust pipe extends from the exhaust port for conveying exhaust gases therefrom. An expansion chamber is also included into which the exhaust pipe discharges. In accordance with the invention, reflective means are positioned contiguous to the end of the exhaust pipe for providing a variable reflection area upon which the exhaust gases in the exhaust pipe may reflect for reducing the pressure at the exhaust port. Means adjust the reflective means effective area in response to an engine condition.

BRIEF DESCRIPTION OF THE DRAWINGS

FIG. 2 is an enlarged top plan view showing the exhaust system for the engine.

DETAILED DESCRIPTION OF THE PREFERRED EMBODIMENTS

Figure 1:
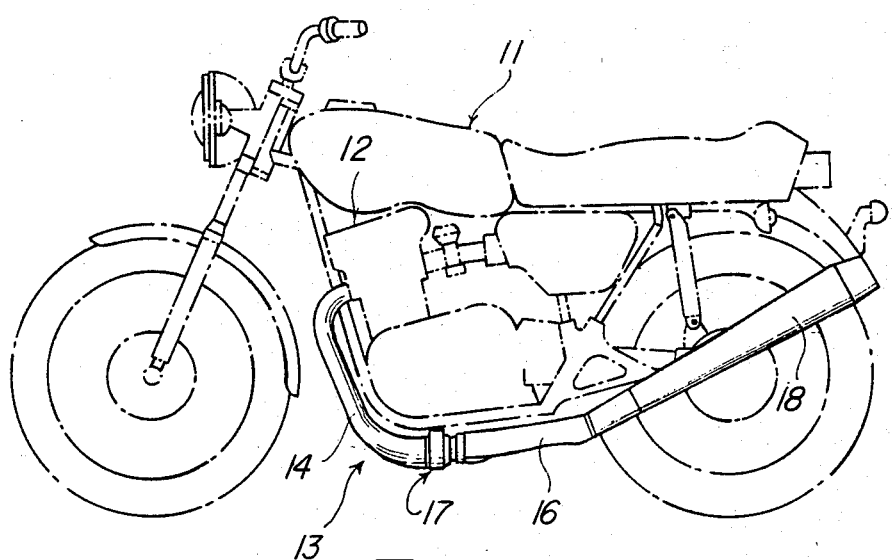
FIG. 1 is a side elevational view of a motorcycle, shown partially in phantom, having an internal combustion engine constructed in accordance with an embodiment of the invention.

Referring now in detail to the drawings and particularly to FIGS. 1 and 2, a motorcycle powered by an internal combustion engine constructed in accordance with an embodiment of the invention is shown partially in phantom and is identified generally by the reference numeral 11. The motorcycle 11 includes a powering internal combustion engine 12 which, in the illustrated embodiment, is depicted as being of the four cylinder, in line type. The engine 12, in the illustrated embodiment, is of the four-cycle type, however, it is to be understood that the invention may be practiced with engines operating on the two-stroke cycle, and on engines having differing numbers of cylinders and different cylinder arrangements. Also, the invention is susceptible of use in other than reciprocating engines. However, the invention has utility in engines of the type wherein there is a substantial overlap between the closing of the exhaust valve and the opening of the intake valve or, in the case of a two-cycle engine, the closing of the exhaust port and the opening of the intake port. Also, the invention can be practiced with single cylinder engines but has particularly utility in multiple cylinder engines.

Since the invention deals with the exhaust system for the engine, the details of the engine have not been illustrated. It is to be understood, however, that the engine has an intake port and an exhaust port which are controlled either by valves, piston movement or the like, depending upon whether the engine is of the two or four-cycle type and that there is a substantial overlap between the opening of the intake valve and the closing of the exhaust valve as will be described.

The engine 12 is provided with an exhaust system, indicated generally by the reference numeral 13, and which is constructed in accordance with an embodiment of the invention. The exhaust system 13 includes a plurality of individual exhaust pipes 14 that are flanged as at 15 at their inlet ends for cooperation with the cylinder head of the engine 12 so as to place the exhaust pipes 14 in communication at their inlet ends with the exhaust ports of the engine 12. At their outlet ends, the exhaust pipes 14 discharge into an expansion chamber 16 through a valve assembly, indicated generally by the reference numeral 17 and constructed in accordance with an embodiment of the invention. The exhaust gases are delivered muffler and tailpipes 18 which lie on opposite sides of the rear wheel of the motorcycle.

Figure 6:
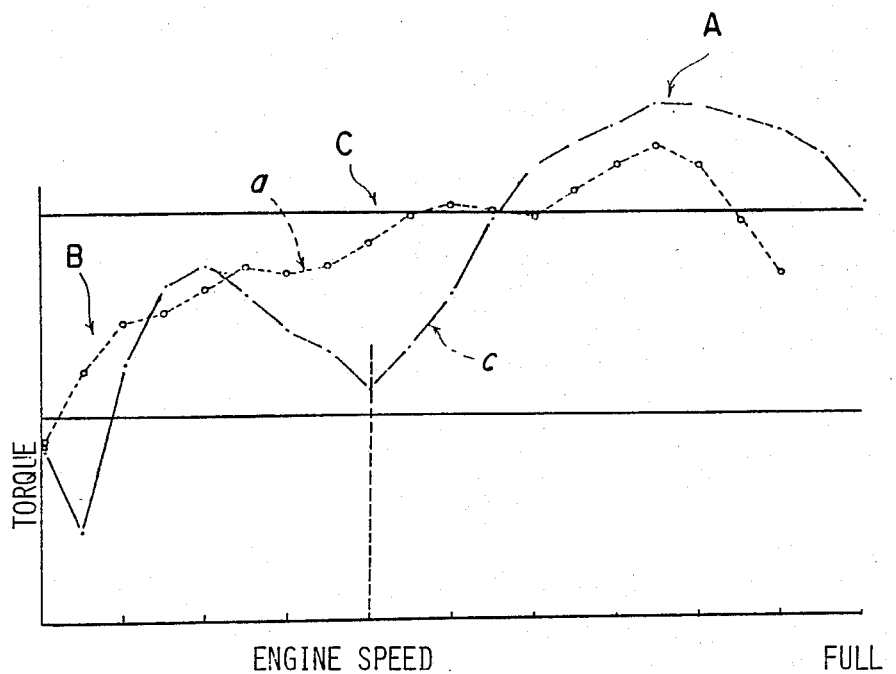
FIG. 6 is a torque curve showing a conventional engine and an engine constructed in accordance with an embodiment of the invention.

Except for the valve mechanism 17 and the way it is operated, which will be described, the engine 12 and its exhaust system 13 may be considered to be conventional. The engine 12 is designed to be of the high output type and has a substantial overlap in its valve timing. As a result, the engine 12, with its exhaust system 13 and without considering the operation of the valve mechanism 17, will produce a torque curve as shown in FIG. 6. The torque curve of a conventional engine of this type is shown by the curve c. As may be seen, at the higher output conditions A, the torque curve is extremely good and provides a high power. However, at the intermediate ranges (C), the torque curve falls off rather badly and these are the normal cruising speeds of the engine. Also, at the idle condition and low speed (B), the torque is also not good and poor running results.

Figure 5:
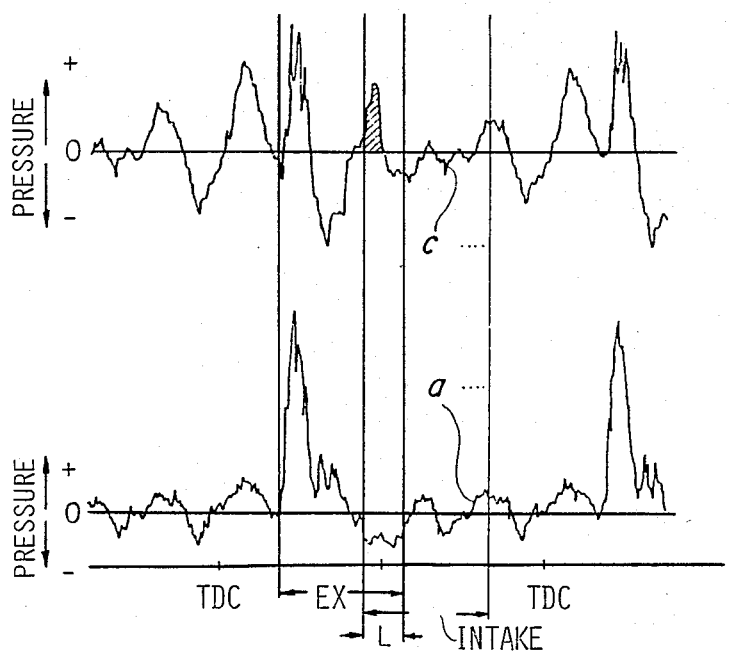
FIG. 5 is a pair of curves showing the pressure at the exhaust port of an engine of the conventional type of an engine constructed in accordance with an embodiment of this invention, under one running condition.

The reason for this may be understood best by reference to Figure 5 wherein the pressure at the exhaust port in accordance with a convention engine is shown by the curve c. This is a pressure trace of the instantaneous pressure at the exhaust port during a cycle of operation at a running condition which is in the mid-range and specifically at a point indicated as the point X in FIG. 6. As may be seen, when the exhaust port initially opens, there are high pressure conditions which exist and then this pressure falls off as the exhaust gases become discharged to the atmosphere. However, at the time when the intake valve opens and the exhaust port is still open, as indicated by the overlap area L, the pressure at the exhaust port with the convention type of engine again becomes positive. As a result, the exhaust gases will tend to flow back into the combustion chamber rather than the chamber being filled with a fresh intake fuel/air charge through the intake port. Hence, there will be dilution of the intake charge and the volumetric efficiency falls off. This is the reason for the poor mid-range and low speed torque curve as shown in FIG. 6.

Figure 7:
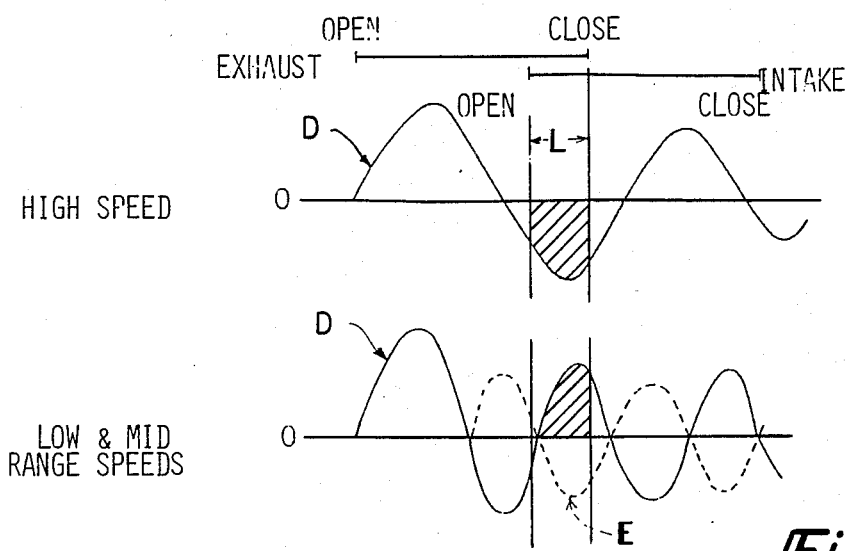
FIG. 7 is a graphical view showing how the positive pressures occur at the exhaust port with conventional engines.

It will be noted that this condition exists only at the lower speed ranges and the reason for this may be understood by reference to FIG. 7. In this figure, the pressure is shown in relation to the valve timing at both high speed and at the low, mid-range conditions. It will be seen that at high speed, the pressure wave is such that during the overlap period, there is a negative pressure which improves both the exhausting of the exhaust gases from the combustion chamber and the intake of fresh air charge. However, at low and mid-ranges, the opposite condition prevails and there is a positive pressure during the overlap period that has the deleterious effects aforenoted.

In accordance with the invention, the valve mechanism 17 is employed for preventing the existence of such positive pressures at the exhaust port during the overlap period and under predetermined running conditions.

Figure 3:
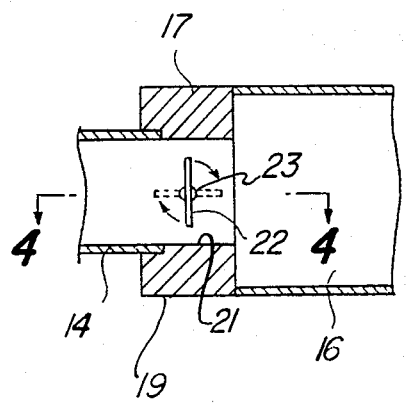
FIG. 3 is an enlarged cross-section view taken along the line 3—3 of FIG. 2.
Figure 4:
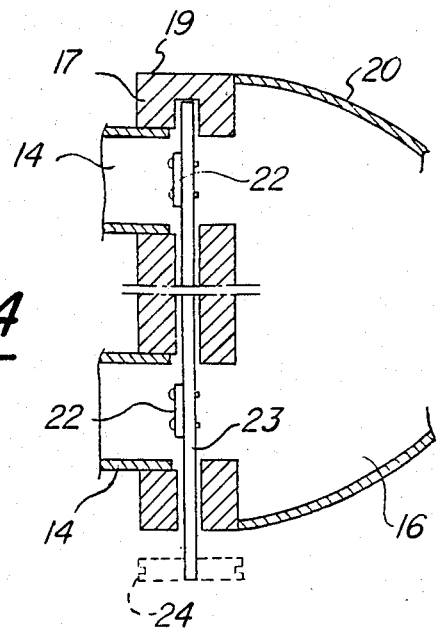
FIG. 4 is a cross-sectional view taken along the line 4—4 of FIG. 3.

Referring now specifically to FIGS. 2 through 4, the valve assembly 17 includes a valve body 19 that has a plurality of passages 21 that cooperate with the exhaust pipe outlets 14 deliver exhaust gases to a collector section 20 that discharges into the expansion chamber 16. In each of the passages 21, there is provided a control valve 22 which acts as a reflective device under certain conditions, as to be described, for controlling the pressure at the exhaust ports of the engine.

The control valves 22 are all affixed to a common control valve shaft 23 that is journaled in a suitable manner in the valve body 19. At one end of the shaft 23, there is provided a control pulley 24 around which is wound a flexible transmitter 25. The transmitter 25 is, in turn, operated by means of a control motor 26 that may be of any known type motor such as a vacuum motor, electric motor, electric solenoid or the like. The control motor 26 is, in turn, operated by means of a logic device 27 that controls the position of the valves 22 in response to preset conditions. These preset conditions may be either engine speed, carburetor throttle valve position, boost pressure (in the event the engine is supercharged), engine load, or any other type of arrangement for providing the necessary control signal in response to the running condition.

In a preferred embodiment of the invention, the cross-sectonal area of the reflective control valve 22 is such that when they are fully closed, as shown in the solid line view of FIG. 3, that they will obstruct approximately one-half of the effective cross-sectional area of the exhaust pipes 14. In certain embodiments, this ratio has been found to give a good overall effect although different relations may be used with other engines. Also, even though butterfly type valves 22 are used in the illustrated embodiment, other type of valves or reflective devices may be used.

Figure 8:
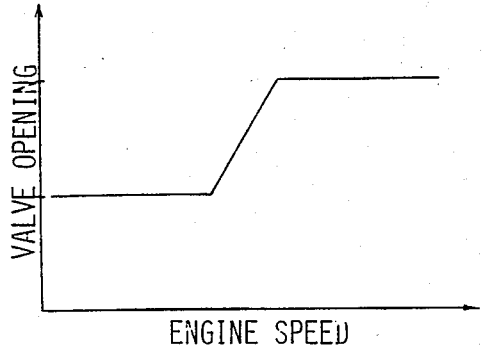
FIG. 8 is a graphical view showing how the reflective valve of an embodiment of the invention may be operated in order to practice the invention.

As has been previously noted and as will become apparent from reviewing FIG. 6, the torque curve c demands some control during the ranges B and C in order to improve the performance. In the simplest embodiment, it is possible to close the control valves 22 in accordance with a curve as shown in FIG. 8. In this case, the valves 22 are maintained fully closed until the engine speed reaches a predetermined speed, such as at the point X and then the valves gradually are opened until they reach their fully opened position at the approximate upper end of the mid-range curve.

The curve a in FIG. 6 shows the effect of the closing of the valves 22. The curve a is generated by keeping the valves 22 in their fully closed position throughout the entire engine speed and load ranges. It will be seen that there is a significant improvement in torque during the ranges B and C and that the torque then falls off from the maximum torque curve during the high speed range A. Thus, if the valves 22 are maintained closed up until the transition between the point C and E, a torque curve will result which is the torque curve a up until this point and then the torque curve becomes the curve c. Therefore, it should be readily apparent that this device is effective in significantly improving the torque at mid-range running.

This effect may also be seen in the pressure curve of FIG. 5 wherein the curve a indicates the pressure at the exhaust port in the condition at point X of the speed curve and with the valves 22 in their fully closed position (one-half of the area of the exhaust pipes 14 closed). By comparing the curves a and c, it may be seen that during the overlap period L, that there are no positive pressures at the exhaust port and this is why the torque curve is significantly improved.

This may also be understood by FIG. 7 wherein the curve E shows the effect of the valve and the fact that it reduces the positive pressure occurrence at the exhaust port during the overlap period.

Figure 9:
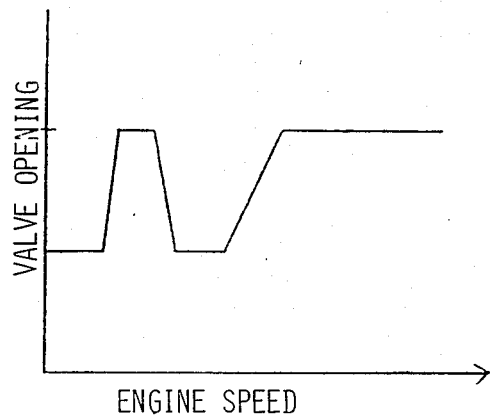
FIG. 9 is a view in part similar to FIG. 8 showing another arrangement by which the reflective valve may be operated.

It may be seen that the conventional engine torque curve c has better performance at certain speeds between idle and half engine speed and thus, the performance can still further be improved by controlling the valve 22 so that they fully open under this condition and then again close as shown in FIG. 9. Of course, the actual tuning of the operation and closure of the valves 22 may be readily determined by those skilled in the art in order to achieve maximum performance for a given engine.

It should be readily apparent from the foregoing description that an improved exhaust system has been provided for an internal combustion engine wherein the engine power output may be improved throughout the entire load and speed ranges without making any sacrifices or compromises. Although the invention has been illustrated in connection with a specific embodiment of the invention, as already noted, various changes and modifications may be made without departing from the spirit and scope of the invention, as defined by the appended claims.

I claim:

1. In an internal combustion engine having a combustion chamber, an exhaust port for discharging exhaust gases from said combustion chamber, an exhaust pipe extending from said exhaust port for conveying exhaust gases therefrom, and an expansion chamber, said exhaust pipe having an end in communication with said expansion chamber and into which said exhaust pipe discharges, the improvement comprising reflective means adjustably positioned in confronting relation to the end of said exhaust pipe for providing a variable reflective area at the end of said exhaust pipe upon which acoustic waves in the exhaust gases in said exhaust pipe will reflect for reducing the pressure at said exhaust port, and selectively operable means for adjusting said reflective means effective area in response to an engine condition.

2. In an internal combustion engine as set forth in claim 1 wherein the reflective means comprises a valve.

3. In an internal combustion engine as set forth in claim 2 wherein the reflective means valve has an area in its closed position approximately one-half of the effective cross-sectional area of the exhaust pipe.

4. In an internal combustion engine as set forth in claim 1 wherein the engine condition comprises engine speed.

5. In an internal combustion engine as set forth in claim 4 wherein the variable reflective area is increased when the engine speed is below a predetermined speed.

6. In an internal combustion engine as set forth in claim 5 wherein the reflective area is increased at idle and during mid-range running.

7. In an internal combustion engine as set forth in claim 6 wherein the reflective means comprises a valve.

8. In an internal combustion engine as set forth in claim 7 wherein the reflective means valve has an area in its closed position approximately one-half of the effective cross-sectional area of the exhaust pipe.

9. In an internal combustion engine as set forth in claim 5 wherein the reflective area is decreased during at least a portion of the idle and mid-range running.

10. In an internal combustion engine as set forth in claim 9 wherein the reflective means comprises a valve.

11. In an internal combustion engine as set forth in claim 10 wherein the reflective means valve has an area in its closed position approximately one-half of the effective cross-sectional area of the exhaust pipe.

* * * * *